(12) United States Patent
Meyer et al.

(10) Patent No.: US 9,037,391 B2
(45) Date of Patent: May 19, 2015

(54) UNMANNED AIRCRAFT WITH BUILT-IN COLLISION WARNING SYSTEM

(75) Inventors: Joerg Meyer, Mainburg (DE); Matthis Goettken, Hoergertshausen (DE); Christoph Vernaleken, Eiterfeld (DE); Simon Schaerer, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 388 days.

(21) Appl. No.: 13/366,700

(22) Filed: Feb. 6, 2012

(65) Prior Publication Data
US 2012/0203450 A1 Aug. 9, 2012

(30) Foreign Application Priority Data
Feb. 8, 2011 (DE) .......................... 10 2011 010 679

(51) Int. Cl.
*G08G 5/02* (2006.01)
*G05D 1/00* (2006.01)
*B64C 39/02* (2006.01)

(52) U.S. Cl.
CPC .............. *G05D 1/0055* (2013.01); *B64C 39/02* (2013.01); *B64B 2201/00* (2013.01)

(58) Field of Classification Search
CPC .............. G01S 13/00; G01S 5/00; G01S 7/00
USPC .............. 701/1, 3, 14, 50, 301, 482; 342/119, 342/159
See application file for complete search history.

(56) References Cited

U.S. PATENT DOCUMENTS

| 5,581,250 | A | 12/1996 | Khvilivitzky |
| 7,061,401 | B2 | 6/2006 | Voos et al. |
| 7,269,513 | B2 * | 9/2007 | Herwitz ........................ 701/301 |
| 7,633,430 | B1 | 12/2009 | Wichgers et al. |
| 7,737,878 | B2 | 6/2010 | Van Tooren et al. |
| 7,818,127 | B1 * | 10/2010 | Duggan et al. ................ 701/301 |
| 7,864,096 | B2 * | 1/2011 | Stayton et al. .................. 342/29 |

(Continued)

FOREIGN PATENT DOCUMENTS

DE 10 2007032084 A1 1/2009
EP 1 505 556 A1 2/2005

OTHER PUBLICATIONS

European Patent Office Search Report in related patent application No. 12000642 dated Feb. 7, 2013.

*Primary Examiner* — John R Olszewski
*Assistant Examiner* — Truc M Do
(74) *Attorney, Agent, or Firm* — Crowell & Moring LLP

(57) ABSTRACT

An unmanned aircraft, unmanned aviation system and method for collision avoidance during the flight operation of an unmanned aircraft are provided. The unmanned aircraft includes a lift and propulsion system and a flight control system having a flight control unit, a navigation system and an actuator system. The flight control unit has an autopilot unit. The flight control unit calculates control commands using data from the navigation system and/or the autopilot unit, which can be conveyed to the actuator system for actuating the lift and propulsion system. A collision warning system is connected with the flight control system, the collision warning system detects a collision situation and makes collision avoidance data available. A connection between the collision warning system and the autopilot unit is provided, in order to initiate an obstacle avoidance maneuver by the autopilot unit with the help of the collision avoidance data.

13 Claims, 11 Drawing Sheets

(56) References Cited

U.S. PATENT DOCUMENTS

| | | | |
|---|---|---|---|
| 8,380,425 B2* | 2/2013 | Duggan et al. | 701/301 |
| 2005/0109872 A1* | 5/2005 | Voos et al. | 244/3.17 |
| 2006/0167598 A1* | 7/2006 | Pennarola | 701/11 |
| 2007/0050101 A1* | 3/2007 | Sacle et al. | 701/11 |
| 2007/0222665 A1* | 9/2007 | Koeneman | 342/29 |
| 2007/0222666 A1* | 9/2007 | Coulmeau | 342/32 |
| 2008/0055149 A1* | 3/2008 | Rees et al. | 342/29 |
| 2008/0169962 A1* | 7/2008 | Rees et al. | 342/29 |
| 2008/0215204 A1* | 9/2008 | Roy et al. | 701/28 |
| 2008/0234878 A1* | 9/2008 | Joao | 701/2 |
| 2008/0243383 A1* | 10/2008 | Lin | 701/213 |
| 2008/0288169 A1 | 11/2008 | Meunier et al. | |
| 2009/0027253 A1* | 1/2009 | van Tooren et al. | 342/29 |
| 2010/0256909 A1* | 10/2010 | Duggan et al. | 701/301 |
| 2010/0292871 A1* | 11/2010 | Schultz et al. | 701/3 |
| 2010/0332136 A1* | 12/2010 | Duggan et al. | 701/301 |
| 2012/0059536 A1* | 3/2012 | Pepicelli et al. | 701/11 |
| 2012/0092208 A1* | 4/2012 | LeMire et al. | 342/29 |
| 2012/0203450 A1* | 8/2012 | Meyer et al. | 701/301 |

* cited by examiner

UNMANNED AIRCRAFT WITH BUILT-IN COLLISION WARNING SYSTEM

CROSS REFERENCE TO RELATED APPLICATION

The present application claims priority under 35 U.S.C. §119 to German Patent Application No. 10 2011 010 679.0, filed Feb. 8, 2011, the entire disclosure of which is herein expressly incorporated by reference.

BACKGROUND AND SUMMARY OF THE INVENTION

The present invention relates to an unmanned aircraft, an unmanned aviation system and a method for avoiding collisions when flying an unmanned aircraft.

Unmanned aircraft are gaining increasing importance in the military arena, and also for civilian applications, in particular for research purposes. In an unmanned aircraft, no pilot is on board to fly the aircraft, as is already indicated by the name. Rather, the flight operation is computer controlled, for example, with the help of a specified route. Moreover, a connection to a control station can be provided, to make it possible to operate the unmanned aircraft by remote control. German Patent Document DE 19849857 C2 describes, for example, a remote control operation method for an unmanned aircraft in which the aircraft can be remotely controlled from the control station on a flight path that is different than a pre-programmed safe route. In the event of the presence of an imminent collision, an obstacle avoidance maneuver can be performed manually in the control station by the respective operator. It has been shown, however, that manually performed obstacle avoidance maneuvers cannot always prevent a collision, for example, because of input errors.

Therefore, there is a need for providing an unmanned aircraft having an improved obstacle avoidance process.

According to an exemplary embodiment of the invention, an unmanned aircraft is provided that has a lift system and a propulsion system and a flight control system. The flight control system has a flight control unit, a navigation system and an actuator system. The flight control unit has an autopilot unit. The flight control unit is provided to calculate control commands by using data from the navigation system and/or the autopilot unit, which can be supplied to the actuator system to activate the lift and propulsion system. Moreover, a collision warning system is provided, which is connected with the flight control system, whereby the collision warning system detects a collision situation and provides obstacle collision avoidance data. A connection between the collision warning system and the autopilot unit is provided in order to initiate an obstacle avoidance maneuver by the autopilot unit with the aid of the collision avoidance data.

According to an exemplary embodiment of the invention, a data connection system is provided to connect with a control station for controlling and monitoring the flight operation of the unmanned aircraft. The data connection system is provided with a prevention mechanism with which the execution of the obstacle avoidance maneuver can be prevented at least temporarily.

For example, the connection between the collision warning system and the autopilot unit can be blocked temporarily. The blocking of the connection between the collision warning system and the autopilot unit can be initiated by the control station. According to a further example of the invention, the collision warning system can be deactivated by the prevention mechanism.

Aborting the obstacle avoidance maneuver can also take place as a result of supplying a specific abort signal to the autopilot, i.e., the data connection remains intact and is not interrupted, but rather, the abort signal is transmitted by the autopilot unit, whereby as a result, it is possible to abort the intended obstacle avoidance maneuver.

Therefore, it can be said for the exemplary embodiment of the unmanned aircraft having the data connection system and the prevention mechanism that it is possible to supply an external signal to the unmanned aircraft, for example, via the data circuit system, whereby it can also be a data circuit system that is already used otherwise, in order to bring about an abort by the autopilot unit, or at least a temporary interruption of the obstacle avoidance maneuver.

In the event an obstacle avoidance maneuver is not initiated at all, feeding a signal into the prevention mechanism causes the autopilot to be activated in such a way and/or adjusted, that when a collision situation is detected, an obstacle avoidance maneuver does not happen. This can be the case, for example, when the collision warning mechanism or the collision warning system does not make a corresponding required signal that represents the obstacle avoidance maneuver available to the autopilot. But it is also possible that the collision warning system conveys the corresponding information of the necessity of an obstacle avoidance maneuver to the autopilot, that there, however, the signal that has been received has no effect at all, i.e., that no obstacle avoidance maneuver is initiated, at least not until a corresponding signal or a corresponding instruction is present, which prevents the execution of an obstacle avoidance maneuver.

In aviation, the responsibility of avoiding a collision can be divided into two ranges, for which reason the term of division into several ranges can be used: An outer range serves the superordinated separation of the aircraft, whereas an inner range is for collision avoidance, i.e., for those cases that cannot be solved by the separation layer. The separation takes place depending on the actual airspace and the flight rules, according to which the aircraft is operated, by the aviation control instance (Air Traffic Control, ATC) or in a manned aircraft, by the pilot. In manned aircraft, the inner layer is always represented by the pilot. For unmanned aircraft according to the invention, a technical solution is provided for the inner collision avoidance layer.

According to an exemplary embodiment of the invention, the collision warning system has at least two modes of operation, whereby the modes of operation can be activated automatically.

According to an exemplary embodiment of the invention, the operating modes can be activated automatically by operating parameters of the aircraft and/or by the flight data.

For example, the execution of an obstacle avoidance maneuver when a specified operating mode is activated can be prevented at least temporarily. According to a further example, in a first mode, in the case of a detected collision situation, collision warnings and obstacle avoidance recommendations can be generated and emitted; in a second mode, in the case of a detected collision situation, only collision warnings can be generated and emitted; in a third mode, in the event of a detected collision situation, no collision warnings or obstacle avoidance recommendation can be emitted.

For example, when the landing gear is deployed, an operating mode can be activated in which obstacle avoidance maneuvers are prevented. For example, when deploying the landing gear, only collision warnings can be generated and emitted. According to a further example of the invention, in the event of a defect in the actuator system and/or the lift system and propulsion system, for example, in the event of a powerplant fault, an operating mode can be activated in which obstacle avoidance maneuvers are prevented, or an operating mode in which only collision warnings are generated and emitted.

According to a further aspect of the invention, the collision avoidance data include instructions for an obstacle avoidance maneuver that related to the ascent rate/descent rate of the aircraft. According to a further aspect of the invention, the collision avoidance data can also include instructions that relate to a change in the flight path of the aircraft. According to a further aspect of the invention, the instructions can pertain to the ascent rate/descent rate as well as the change in flight path of the aircraft.

According to an exemplary embodiment of the invention, when the data connection fails, the collision warning system can be automatically connected with the autopilot unit, and in the case of a detected collision situation and generated collision avoidance data, an obstacle avoidance maneuver can be executed automatically by the autopilot unit.

This ensures improved safety when operating an unmanned aircraft according to the invention, for example, in the case of a break in the data link or in the case of transmission delays.

The objective of the invention is also achieved by an unmanned aviation system, which has at least one unmanned aircraft, at least one control station and a data connection. The aircraft is designed according to one of the exemplary embodiments, aspects or examples cited in the preceding text. The control station is used for controlling and monitoring the flight operation of the unmanned aircraft. The data connection is provided between the control station and the unmanned aircraft. The control station has an input unit with which a signal can be generated that can be fed to the unmanned aircraft by using the data connection, in order to bring about an at least temporary prevention of an obstacle avoidance maneuver.

In the aircraft system according to the invention, one or more unmanned aircraft can be controlled by a control station. But in the aviation system according to the invention, respectively one control station can also be provided for an unmanned aircraft. For the sake of simplicity, the variant having one control station and one unmanned aircraft will be described in the following, which to the extent applicable, also applies, however, to the other possible combinations.

For example, via the control station, the obstacle avoidance maneuver controlled by the autopilot unit can be influenced using the data connection, for example, for controlling or regulating or also aborting.

According to an exemplary embodiment of the invention, the control station has a man/machine interface, which is provided with a display, whereby the collision avoidance data can be shown on the display.

According to an exemplary embodiment of the invention, the collision avoidance data have control commands for the obstacle avoidance maneuver, which can be represented as text.

The control commands can be instructions about the rate of ascent/descent and/or a change in flight path. Allowed ranges pertaining to the control command can be displayed. The collision avoidance data can have various directive steps and/or warning steps, whereby the directive steps and/or warning steps can be displayed by a graphic representation of the control commands. For example, the respectively activated mode of operation can be displayed.

The objective of the invention is also achieved by a method for collision avoidance during the flight operation of an unmanned aircraft, which includes the following steps:

a) Detecting a collision situation with a collision warning system of the unmanned aircraft;
b) generating collision avoidance data by the collision warning system;
c) supplying the collision avoidance data to an autopilot unit of the unmanned aircraft, and
d) initiating an obstacle avoidance maneuver by the autopilot unit.

According to an exemplary embodiment of the invention, a prevention signal is conveyed to a prevention mechanism, and at least one obstacle avoidance maneuver is at least temporarily prevented.

For example, the prevention signal causes the connection of the collision warning system to the autopilot unit to be temporarily interrupted or blocked.

The interruption of the execution of an obstacle avoidance maneuver can be performed in various ways. For example, in the case of a signal received via the data connection system for the activation of the prevention mechanism, the obstacle avoidance maneuver can be terminated immediately, and a flight direction can be activated, which causes a successive return to the original flight path or to a specified flight route. According to another example, the return to the originally provided flight path can also take place in as short a period of time as possible, whereby the period of time depends on the possible flight maneuvers in which a stall can be avoided with sufficient certainty. According to a further example, the return to the original flight path can also take place at a significantly later point in time, in order to prolong the duration of the flight as little as possible. The initiation of an abort of an obstacle avoidance maneuver can, as has already been indicated, be subject to an interruption of the data connection, whereby this can be caused by an interruption of the data stream in a physically maintained data connection, or also by an actual physical break of the data circuit, for example by a break in a cable connection.

For example, the prevention signal causes that the unmanned aircraft is returned to the specified corridor and/or the goal. For example, the unmanned aircraft can be returned to the originally planned trajectory.

According to an exemplary embodiment of the invention, the prevention signal is generated by a control station for controlling and monitoring the flight operation of the unmanned aircraft and is conveyed to the unmanned aircraft by a data connection.

According to an exemplary embodiment of the invention, when the data connection fails, the collision warning system will automatically be connected with the autopilot unit, and in the event a collision situation has been detected and collision avoidance data have been generated, the autopilot unit automatically performs an obstacle avoidance maneuver.

According to a further aspect of the invention, switching to the autopilot in the case of an interrupted connection ensures that the on board collision warning system performs a safety net function not representing a routine tool relative to the flight operation of the unmanned aircraft. Although to ensure the necessary distance between aircraft, the flight can be influenced in advance by a control station, however, potential latencies in the data link, i.e., the connection, represent a problem. When the data link is interrupted, it is ensured according to the invention, that the obstacle avoidance maneuver will be performed, as it takes place independent of the manual intervention of an operator. The automatic obstacle avoidance is also advantageous because the time budget available for initiating the obstacle avoidance maneuver is very limited, which also means that unnecessary obstacle avoidance maneuvers are not desirable.

For example, the unmanned aircraft has a flight control system having a flight control unit, an actuator system and a navigation system. Furthermore, an air data system can be provided. The flight control unit further includes the autopilot unit. The flight control unit calculates control commands—using data from the navigation system and the autopilot unit and if necessary, data from the air data system—which are fed to the actuator system for activating the lift and propulsion system to fly the unmanned aircraft.

For example, the autopilot unit can—upon the conclusion of an obstacle avoidance maneuver and also if necessary, upon an interrupted obstacle avoidance maneuver, guide the unmanned aircraft back to the specified flight path, i.e. corridor or trajectory and/or to the goal.

It should be noted that the characteristics of the exemplary embodiments, forms of embodiments and aspects of the mechanisms also apply to embodiment forms and aspects and/or examples of the method and vice versa.

Furthermore, those characteristics for which this is not explicitly cited can be freely combined with each other.

BRIEF DESCRIPTION OF THE DRAWINGS

In the following, with the aid of the attached drawings, an exemplary embodiment of the invention will be addressed in further detail.

In the following, the exemplary embodiments of the invention are addressed in further detail with the help of the enclosed drawings. Shown are.

DETAILED DESCRIPTION OF THE DRAWINGS

Figure 1:
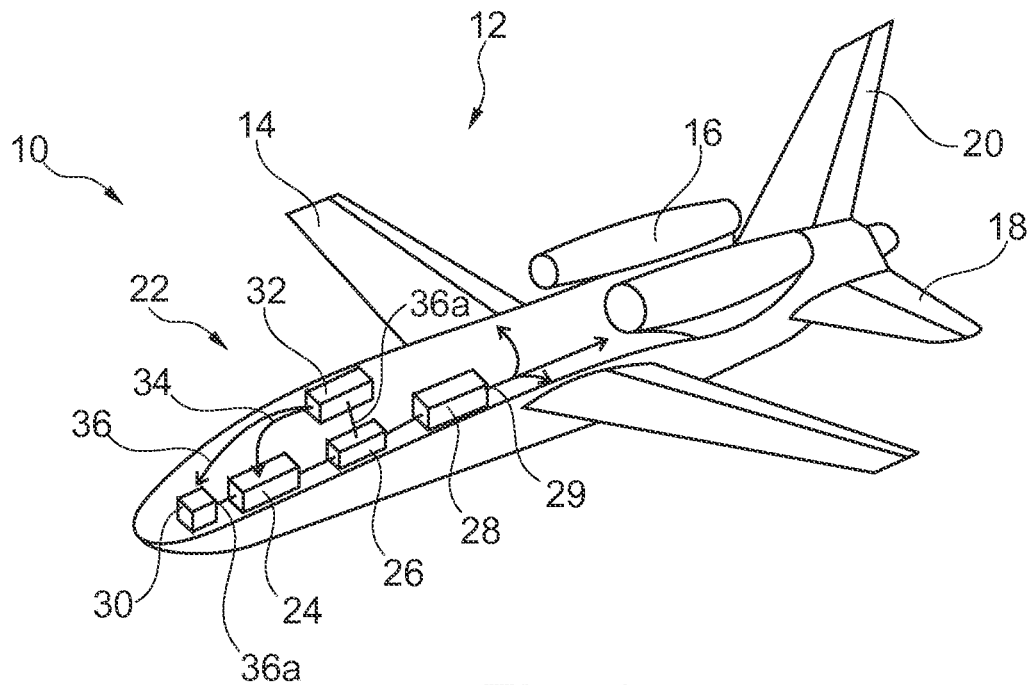
FIG. 1 an unmanned aircraft according to a first exemplary embodiment of the invention.

In FIG. 1, an unmanned aircraft 10 is shown according to a first exemplary embodiment of the invention. Aircraft 10 has a lift and propulsion system 12. For example, an airfoil structure 14 in the form of two lateral wings is shown as an important characteristic of the lift system. Further, two powerplants 16 are shown, which are provided for the necessary propulsion; furthermore, in the posterior section an elevator unit 18 and a fin 20 are shown. Aircraft 10 can, for example, have a fuselage design similar to an aircraft, which, however, does not have reference numbers.

It should be noted that unmanned aircraft 10 according to the exemplary embodiments shown, is an unmanned aircraft. However, the invention relates likewise to other types of aircraft that include, in addition to aircraft, also particularly helicopters and other so-called gyroplanes. Moreover, the invention also relates to airships in which the lift is not produced by the wing design, at least not the important part of it, but by a lifting body. With respect to the possibilities of propulsion, the figures show a powerplant or a pair of powerplants by way of example, whereby it is expressly pointed out that of course, other possibilities of propulsion can also be used, in particular propeller drives and different combinations and also a different number of the units that are used. Likewise, other aircraft structures are possibilities such as, for example, so-called flying wings, in which no separate fuselage is provided, as well as aircraft with a number of wing elements or also different drive systems such as, for example, Flettner rotors and their further developments.

It is important for the unmanned aircraft according to the invention and their different embodiments that aircraft 10 has devices that ensure that the aircraft can fly in air and that its direction of flight can be controlled. The term direction of flight includes changes in direction that are vertical, i.e., the rate of ascent and descent, as well as changes in direction horizontally, i.e., changes in flight path. The term flight is intended to also apply to locomotion, for example, of a balloon, which is usually brought into context with the term "driving". Accordingly, the invention can also be used for those types of balloon designs in which corresponding controllable propulsion components are provided, and in which the possibilities for regulating lift are also provided, in order to ensure the described controllability.

Returning to FIG. 1, unmanned aircraft 10 further has a flight control system 22. This flight control system 22 has a flight control unit 24, a navigation system 26 and an actuator system 28. The cited characteristics are illustrated schematically with a case or box, whereby it is pointed out explicitly that navigation system 26 and flight control unit 24 can also be integrated. Moreover actuator system 28 is shown schematically and includes control elements or actuators and control lines or signal lines that are not shown. In any event, the actuator system must ensure that unmanned aircraft 10 is controllable by using lift and propulsion system 12. Correspondingly, the actuator system also includes a connection to powerplants 16 in addition to connections to wing flaps or other control elements at wings 14 that are not shown in further detail, as well as to pitch elevator 18 or elevator unit and fin 20, etc. The activation of the cited control elements is illustrated symbolically with an arrow structure 29. For example, the actuator system drives the control surfaces into the commanded position.

Flight control unit 24 also has an autopilot unit 30. Flight control unit 24 is provided to calculate control commands using data from navigation system 26 and/or autopilot unit 30 that can be conveyed to the actuator system to activate lift and propulsion systems 12. The connections or the data circuits between flight control unit 24, navigation system 26 and actuator system 28, as well as the provision of data and control commands by autopilot unit 30, are symbolically illustrated with a connection between the individual boxes in FIG. 1. Of course, this connection can be established, for example, by a bus system or by another connection, for example, by a central control unit.

Furthermore, according to the invention, a collision warning system 32 is provided that is connected with flight control system 22, which is, however, not shown in further detail. Collision warning system 32 detects a collision situation and provides collision avoidance data, which is indicated by an arrow 34.

Furthermore, a connection 36 is provided between collision warning system 32 and autopilot unit 30, in order to initiate an obstacle avoidance maneuver by autopilot unit 30 based on collision avoidance data. Connection 36 is shown schematically and can, of course, also be made indirectly, for example, by a connection of collision warning system 32 with flight control unit 24, which is schematically indicated by reference number 36a. Furthermore, it can be provided that flight control system 22 has an air data system, which is, however, not shown in further detail, which transmits data to the flight control unit in order to calculate the control commands.

If, for example, a bus system is provided for connecting the collision warning system with the flight control unit, also called flight control computer, corresponding messages can be transported by this bus system, with which the collision warning system communicates its current status to the flight control computer. These can be an identified conflict with another aircraft, the absence of conflicts, but also the information that a conflict was successfully resolved, or also status information of the collision warning system itself. According to a further aspect of the invention, the collision warning system can be connected with the flight control system as super-ordinated unit. According to a further aspect of the invention, the collision warning system can be connected with the flight control system as super-ordinated unit.

The collision warning system can, for example, be designed as TCAS system. In a TCAS system, the collision warning system of the unmanned aircraft communicates with the transponders of other aircraft in the airspace and determines the surrounding traffic situation from the transmitted data in order to thereby determine a possible collision situation. The parameters that are cyclically calculated by a TCAS system of an aircraft in relation to other aircraft, such as distance, direction, approach speed, flight elevation and ascent or descent rate, make it possible for the system to predict the danger of a collision.

On the basis of these parameters, the TCAS determines the closest point of approach (CPA), and the time period (TAU) that is needed for arrival at this location in airspace. This is explained in further detail in FIG. 11.

Figure 2:
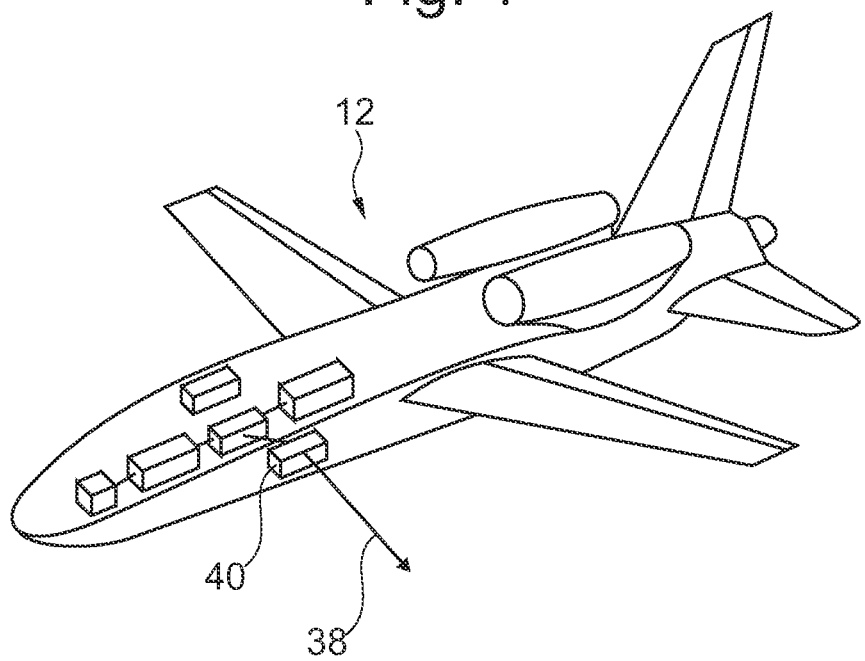
FIG. 2 a further exemplary embodiment of an unmanned aircraft according to the invention.

According to a further exemplary embodiment shown in FIG. 2, a data connection system 38 is provided, which is indicated schematically in FIG. 2, and which connects with a control station—not shown—for controlling and monitoring the flight of the unmanned aircraft. Data connection system 38 is provided with a prevention device 40, likewise on board of unmanned aircraft 12, whereby by using prevention mechanism 40, the execution of an obstacle avoidance maneuver can be prevented at least temporarily.

For example, the execution of an obstacle avoidance maneuver can be interrupted or aborted. According to a further example, the connection between the collision warning system and the autopilot unit can be blocked temporarily, at least the data transfer. The blocking of the connection between the collision warning system and the autopilot unit, for example, can be triggered by the control station (not shown). For example, the collision warning system 32 can be deactivated by prevention mechanism 40.

Figure 3:
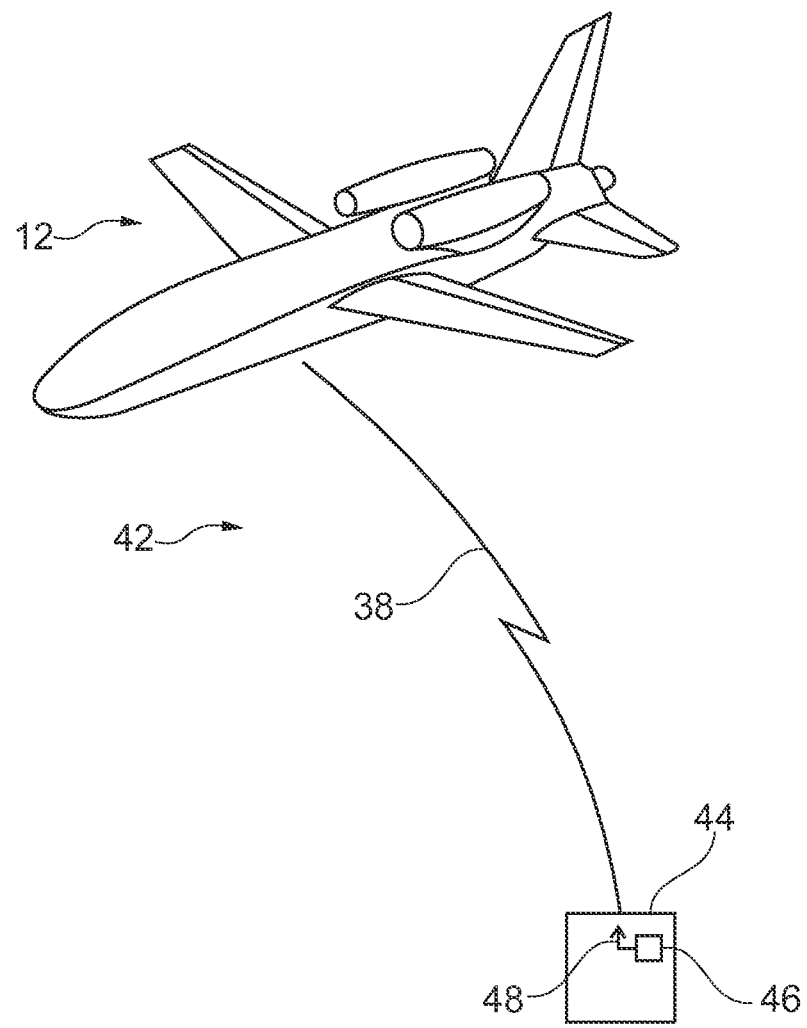
FIG. 3 an unmanned aviation system according to an exemplary embodiment of the invention.

According to the invention, an unmanned aviation system is also provided, which is shown in FIG. 3 in a first exemplary embodiment. Unmanned aviation system 42 has at least one unmanned aircraft 12 according to one of the preceding exemplary embodiments and aspects. Furthermore, at least one control station 44 for controlling and monitoring the flight of unmanned aircraft 12 is provided, and also a data connection 38 between the control station and the unmanned aircraft. Control station 44 has an input unit 46 using which, a signal can be generated, which can be conveyed to unmanned aircraft 12 by data connection 38, in order to produce an at least temporary prevention of the obstacle avoidance maneuver. The signal is shown schematically by arrow 48.

Via data connection 38, for example, an operator can be informed by control station 44, for example, an earth station, about the status of the collision warning system, for example a TCAS system and via the data connection, he has the possibility—by using a defined command, which is defined by the operator in the ground control station and sent to the on-board system of the unmanned aircraft via data link—to influence the execution of the obstacle avoidance maneuver that is initiated by the collision warning device on board of the unmanned aircraft.

The generally provided automatic activation of the collision warning system and the obstacle avoidance recommendation that is converted into corresponding control commands in the autopilot lead to a higher level of safety of unmanned aircraft. By using the above described prevention or the abort of an obstacle avoidance maneuver, the operator can deactivate the automatic execution, for example, by using the command defined above.

Figure 4:
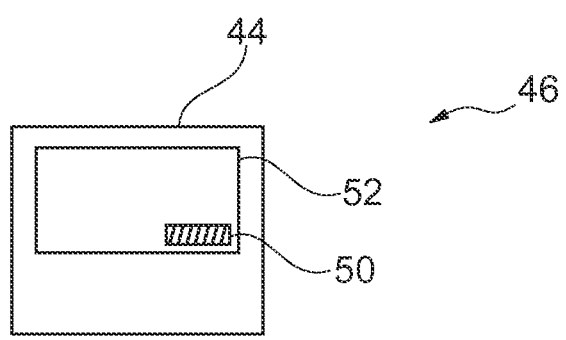
FIG. 4 an input unit for use in an unmanned aviation system, for example, according to FIG. 3.

For example, input device 46 is a surface 50 that can be activated on a visual display device 52, which is shown schematically in FIG. 4. For example, surface 50 can be activated by moving a cursor that is not shown in further detail, and a mouse click. Furthermore, it is possible to design surface 50 that can be activated as a touch-sensitive surface on a monitor, for example, a touch screen.

According to the invention it is provided to only provide an unmanned aviation system 42 in which control station 44 can intervene in the obstacle avoidance maneuver controlled by the autopilot unit via data connection 38, for example, by controlling or regulating, or preventing an obstacle avoidance maneuver.

According to a further aspect of the invention, the result of the collision warning system, i.e., the collision avoidance data or the information about a collision situation can be transmitted to the control station, for example, a ground control station and shown there on the display, for example, as symbols or as text information.

Figure 5:
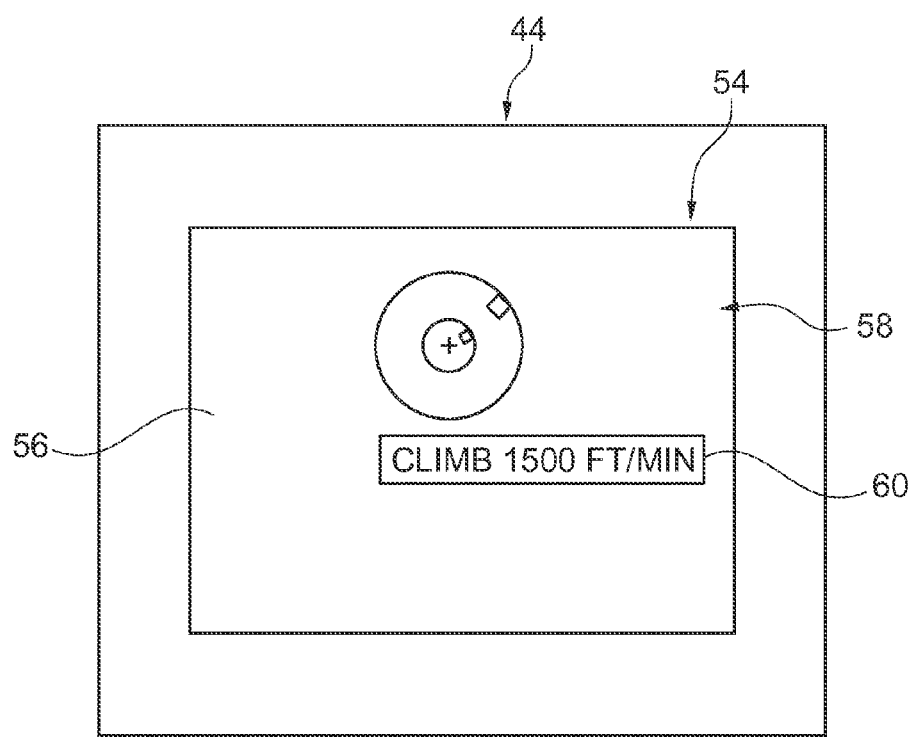
FIG. 5 a control station for use by an unmanned aviation system according to the invention, for example, according to the aviation system shown in FIG. 3.

FIG. 5 shows a further exemplary embodiment in which control station 44 can have a man/machine interface 54 that has a display 56, whereby collision avoidance data 58 can be shown on display 56, whereby collision avoidance data 58 also have control commands 60 for the obstacle avoidance maneuver, which can be represented as text.

For example, control commands 60 have instructions pertaining to a rate of ascent/descent and/or a change in flight path. Moreover, it is also possible to display admissible ranges pertaining to control commands 50.

According to a further example that is not shown it is possible that the collision avoidance data have different directive steps and/or warning steps, whereby the directive steps and/or warning steps are displayed by a graphic representation of the control commands.

According to a further aspect of the invention, collision warning system 32 has at least two modes of operation that can be activated automatically. This will be explained with the help of FIG. 6. Collision warning system 32 is shown schematically by a box. Two lateral arrows 62, 64 indicate that collision warning system 32 can have a first mode 66 and a second mode 68. For example, in first mode 66, in the case of a detected collision situation, collision warnings 70 and obstacle avoidance recommendations 72 are generated and emitted, which is indicated with a further arrow 74 that points to a box 76. For example, in second mode 68, in the case of a detected collision situation, only collision warnings 70 can be generated and emitted, which is illustrated by a second horizontal arrow 78 that ends in a box 80. Collision warnings 70 can, for example, contain traffic warnings. Furthermore, a third mode 82 can be provided in which, in the case of a detected collision situation, no collision warnings or obstacle avoidance recommendations are emitted. To illustrate this, a third arrow 84 is provided.

Figure 6:
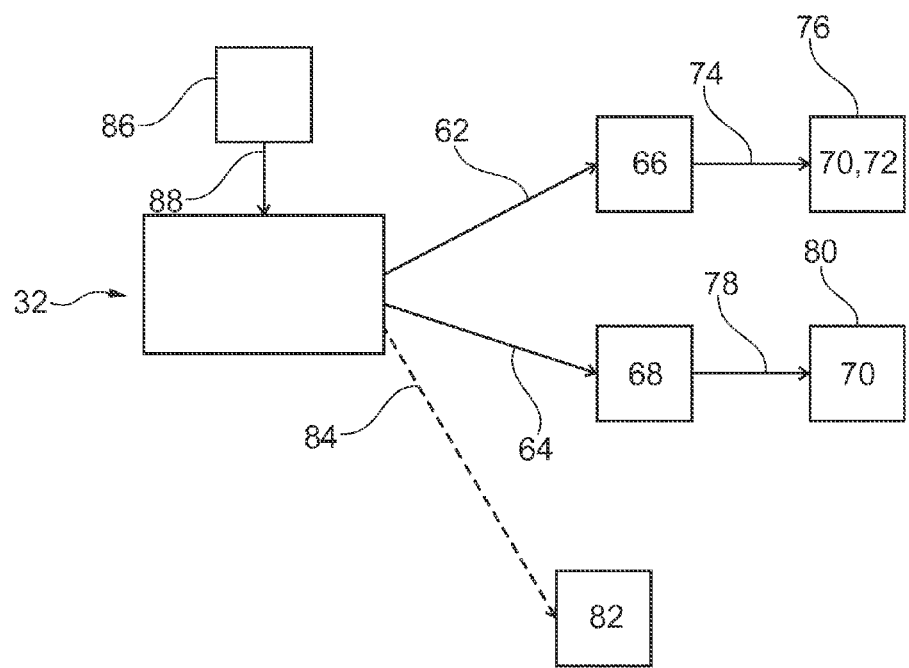
FIG. 6 a collision warning system according to the invention for use in an unmanned aircraft according to the invention.

According to a further aspect of the invention, that is likewise shown in connection with FIG. 6, which is, however, not absolutely required, the operating modes are, for example, the three modes 66, 68, 82, that can be activated automatically by the operating parameters of the aircraft and/or by the flight data, for which an additional box 86 is shown in FIG. 6, from which an additional arrow 88 extends in the direction of collision warning system 32, which illustrates the parameter input or the data input into the system. The flight data can, for example, include the emission of a signal by flying over certain waypoints.

For example, upon deploying a landing gear, an operating mode can be activated in which obstacle avoidance maneuvers are prevented, which is not shown in further detail. For example, upon deployment of the landing gear, an operating mode can also be activated in which only collision warnings are generated and emitted. According to a further example, upon deployment of the landing gear, an operating mode can be activated in which neither collision warnings nor obstacle avoidance recommendations are generated and emitted. Moreover, it is possible upon a fault in the actuator system and/or the lift and propulsion system, for example, in the case of a powerplant fault, to activate an operating mode in which obstacle avoidance maneuvers are prevented, or an operating mode, in which only collision warnings are generated and emitted, or an operating mode in which neither collision warnings nor obstacle avoidance recommendations are generated or emitted.

As has already been mentioned, the collision avoidance data, for example, collision avoidance recommendations 72, can include instructions for an obstacle avoidance maneuver that relate to the rate of ascent/descent of an unmanned plane or unmanned aircraft. For example, it is also possible that the collision avoidance data having the instructions for an obstacle avoidance maneuver relate to a change in the flight path of the aircraft. Of course, the instructions can also include both aspects.

According to a further aspect of the invention it is provided that upon activation of a specified operating mode, the execution of an obstacle avoidance maneuver can be prevented temporarily. This can, for example, be specified for the third operating mode 82. Beyond that, it is also possible to overlay a further operating mode onto the displayed operating modes to, for example, provide a corresponding emission of either collision warnings and obstacle avoidance recommendations just like in first mode 66, or only the emission of collision warnings just like in the second mode 68, and to provide simultaneously that the autopilot system or autopilot unit 30 does not execute an obstacle avoidance maneuver, or in the case of an obstacle avoidance maneuver that is already in progress, interrupt or abort such.

The change in operating mode of the collision warning system takes place, autonomously on board, for example, based on the status information of the unmanned aircraft, for example, the flight plan of the unmanned aircraft.

The automatic change of the operating mode of the collision warning system can, for example, be initiated by the flight control system due to pre-programmed trigger points that are stored in the flight plan of the unmanned aircraft, for example, activation by waypoint characteristics, that were defined within the scope of the mission plan by the operator of the unmanned aircraft. A further possibility also exists therein, that the operating mode is activated by a change of the flight phases of the flight control system of the unmanned aircraft, for example, during take-off or in the approach for landing.

If the collision warning system reports, for example, an obstacle avoidance recommendation to the flight control unit, such will be tested in the flight management of the flight control system for consistency. If the execution of the requested obstacle avoidance maneuver is activated in flight management, it commands the rate of ascent/descent requested by the collision warning system and/or the change of flight path to the flight control function together with the request that it be switched to the corresponding mode in order to implement the ascent or descent rate instructions, or change in flight path.

If the collision warning system reports, for example "clear of conflict" or if the operator of the unmanned aircraft commands an abort of the obstacle avoidance maneuver, the flight management of flight control then commands to once again activate the standard mode.

If the flight control function receives an ascent/descent rate command, the longitudinal control function switches to a corresponding mode. The lateral control of the unmanned aircraft thereby does not need to be touched and continues to follow the flight path prescribed by the waypoints, unless the flight control function also received a command to change the flight path. If the standard control mode is activated, the flight control follows the flight path prescribed by the waypoints. If a previous obstacle avoidance maneuver had built up an altitude difference between specification and actual position of the unmanned aircraft, the unmanned aircraft is then guided back to the specified altitude.

Figure 7:
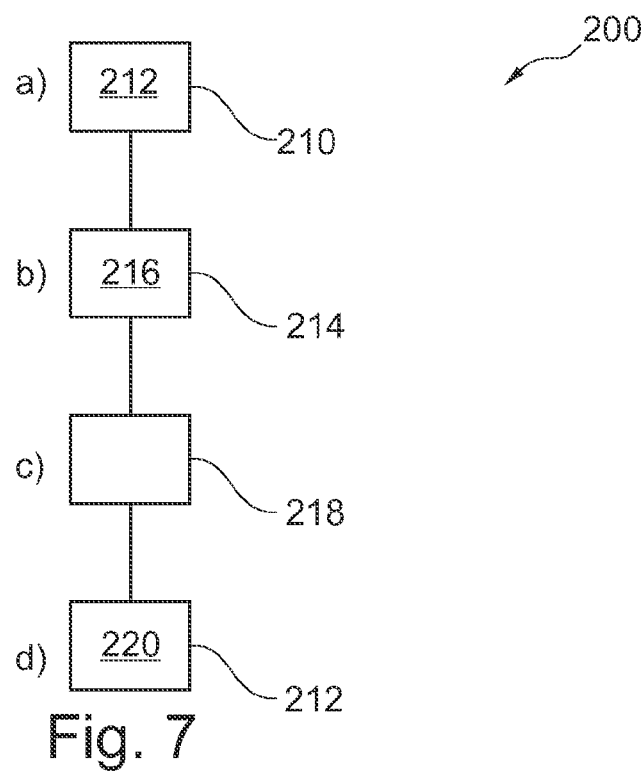
FIG. 7 a method for collision avoidance during the flight operation of an unmanned aircraft according to an exemplary embodiment of the invention.

In FIG. 7, the important steps of method 200 according to the invention for collision avoidance during the flight operation of an unmanned aircraft are shown schematically. Method 200 includes the following steps: In a detection step 210, a collision situation 212 is captured by a collision warning system of the unmanned aircraft. Subsequently, a generation 214 of collision avoidance data 216 is provided by the collision warning system. Subsequently, a conveying 218 of the collision avoidance data to an autopilot unit of the unmanned aircraft takes place. Finally, an obstacle avoidance maneuver 220 is initiated by autopilot unit 222.

Therewith, an unmanned aircraft is in the position in the event of an impending collision, to capture this collision situation 212 and by executing the obstacle avoidance maneuver 220, to prevent a collision by an autopilot unit on board of the unmanned aircraft.

According to a further exemplary embodiment of the invention prevention signal 224, as shown in FIG. 7, is conveyed to a prevention device 226, which is illustrated with an arrow 228. Prevention device 226 ensures that an obstacle avoidance maneuver 220 is prevented at least temporarily, whereby in FIG. 8 the prevention is indicated by a break 230 of a connection line 232 between box 218 and box 222. Causing the at least temporary prevention is shown schematically with an arrow 234 that is directed from prevention device 226 in the direction of the connection line or dotted connection line 232.

It should be noted that the effect of the prevention device can also be provided at a different point of the method. For example, an impact on the collision warning system can already prevent the generation of collision avoidance data, so that an execution of the obstacle avoidance maneuver also cannot take place. In any event, the prevention signal has the effect that according to one example, the connection of the collision warning system with the autopilot unit is temporarily interrupted, for example, by an interruption of the data stream, as well as also, for example, by actual a physical break of the connection line, as it has already been indicated above.

Figure 9:
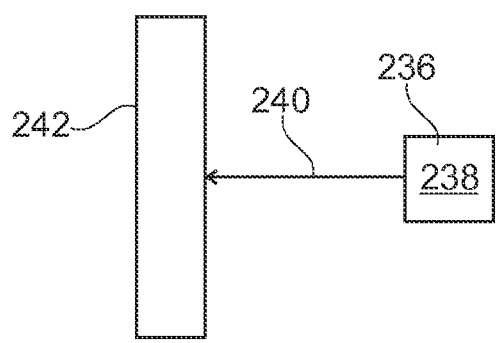
FIG. 9 a further aspect of an exemplary embodiment for a method for collision avoidance during the flight operation of an unmanned aircraft according to the invention.

According to a further aspect of the invention, a method is provided, which is shown in FIG. 9, in which the prevention signal is generated by a control station 236 for controlling and monitoring the flight operation of the unmanned aircraft, which is indicated by reference numbers 238, and is conveyed to the unmanned aircraft via a data connection 240, shown schematically by a box 242 in FIG. 9.

Figure 8:
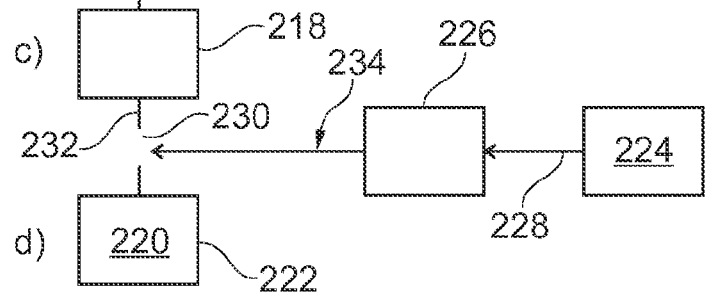
FIG. 8 a further exemplary embodiment of the method according to the invention for collision avoidance during the flight operation of an unmanned aircraft.

According to one aspect of the invention it is thus possible to provide the generation of a prevention signal 224 on board of the unmanned aircraft as shown in FIG. 8. According to the schematically shown exemplary embodiment of the invention in FIG. 9, it is provided that a connection signal is generated outside of the unmanned aircraft, for example by a control station 236, and is conveyed to unmanned aircraft 242 via data connection 240.

The control station can, for example, be on earth or also within an airborne, separate aircraft. It should be noted that the control station can be provided fixedly installed, as well as stationary, i.e., mobile. Moreover, according to the invention, an exemplary embodiment is provided in which the control station is on board of a watercraft, for example, a ship or a submarine, or even on board of a mobile or fixedly installed floating platform, which also applies to platforms above water and also control stations under water that are anchored on the sea floor, or are platforms mounted on pillars.

Figure 10:
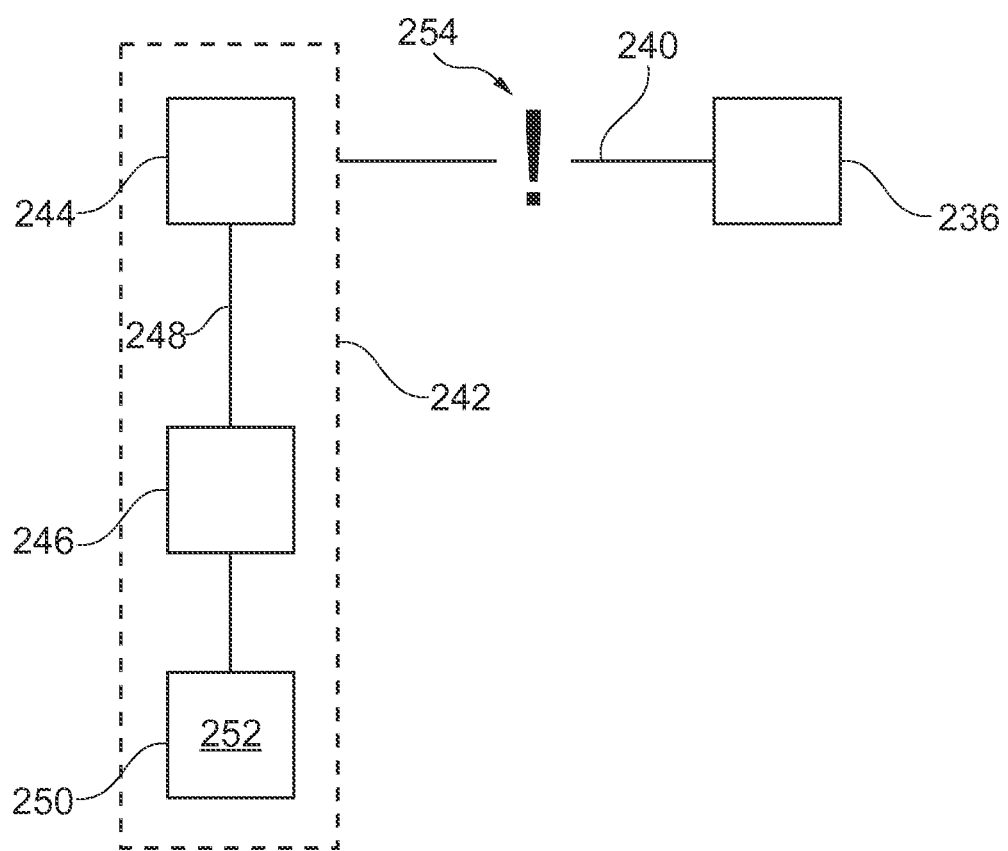
FIG. 10 a further aspect of a method according to the invention for collision avoidance during the flight operation of an unmanned aircraft.

According to a further exemplary embodiment of the invention, shown in FIG. 10, a method is provided in which upon an interruption of data connection 240 between control station 236 and unmanned aircraft 242, the collision warning system is automatically connected with the autopilot unit and in the event of a detected collision situation and generated collision avoidance data, the autopilot unit automatically executes an obstacle avoidance maneuver. For this purpose, the unmanned aircraft 242 is shown in a dotted outer frame in FIG. 10, within which a first box 244 represents the collision warning system, and a second box 246 represents the autopilot unit. The automatic connection is shown with a connection line 248 between the collision warning system 244 and autopilot unit 246. A further box 250 represents the execution of an obstacle avoidance maneuver, whereby the obstacle avoidance maneuver is shown within an additional box 250 that is identified by reference number 252.

The break, i.e., the failure of data connection 240 is indicated symbolically with an exclamation mark 254, with which connection line 240 between control station 236 and aircraft 242 is clearly visibly interrupted.

Of course, a failure 254 of data circuit 240 can be a complete failure of, for example, a radio connection, and can also be a faulty radio connection that still continues to be maintained.

According to the exemplary method shown in FIG. 10 it is ensured that unmanned aircraft 242 avoids a collision even then, due to the provided automatic execution of the obstacle avoidance maneuver, when intervention by the control station is no longer possible, as the data connection is broken or interrupted. It is therefore possible to manually influence the execution of an obstacle avoidance maneuver from the control station, for example, to prevent it or also to execute it differently manually, without risking the danger of a collision in the event of a break in the data connection, as in such a case, an obstacle avoidance maneuver will be performed automatically.

It should be noted in connection with FIG. 10 that the shown connection 248 of collision warning system 244 having autopilot unit 246 represents a data connection that can either be provided directly between the two components or units or also indirectly by the connectivity of the flight control system that has already been illustrated in FIG. 1.

As already mentioned above, a method can be provided in which the autopilot unit returns the unmanned aircraft to the specified corridor and/or the specified goal upon the conclusion of an obstacle avoidance maneuver.

The possibility described above that the operator or user intervenes in the automatic performance of an obstacle avoidance maneuver via the control station can, according to the invention, also be described as opt-out logic. The automatic gearing down to the autopilot or, in the provided obstacle avoidance maneuvers the initiation of obstacle avoidance maneuvers when the data line is interrupted ensures, that the unmanned aircraft according to the invention is always in a position to avoid a collision with other objects that carry a transponder, for example, other aircraft. Therewith, for example, the operation of unmanned aircraft in the airspace classes A, B and C as well as D becomes possible with special procedures. Let it be pointed out at here that the opt-out logic is not a direct requirement for the latterly cited aspect, but only represents an additional possibility of control.

Figure 11:
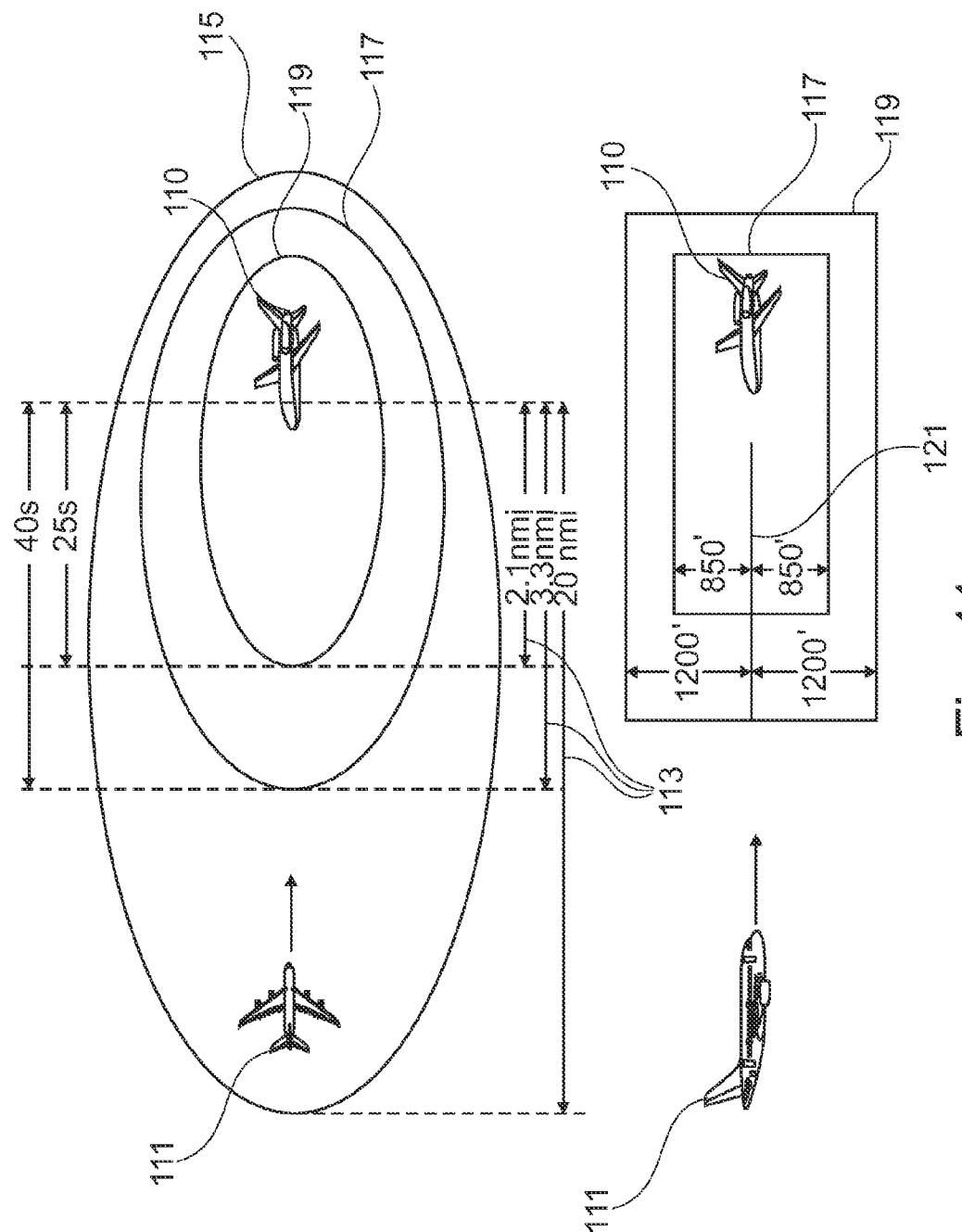
FIG. 11 a schematic overview of a system and method according to the invention for collision avoidance during the flight operation of an unmanned aircraft.

In FIG. 11, an unmanned aircraft 110 according to the invention is shown schematically. Furthermore, an aircraft 111 is shown schematically, which moves in the direction of unmanned aircraft 110. Protective zones of the time intervals up to the collision are defined around unmanned aircraft 110. The intervals are shown schematically in the lower section with distance arrows 113.

For example, a first larger protective zone 115 is shown around unmanned aircraft 110 for a distance of 20 nautical miles (NM), as well as a second protective zone 117 of 3.3 NM and a third protective zone 119 of 2.1 NM. Let it be pointed out that the cited values are mentioned as exemplary threshold values, which can be specified by a system such as TCAS.

By way of example, within the second protective zone 117, only one collision warning is generated and made available, which is shown in FIG. 11 by the letter TA, standing for Traffic Advisory.

In the third protective zone 119, an obstacle avoidance recommendation is generated and emitted, represented by the letters RA standing for Resolution Advisory. In FIG. 11, in the lower section, the situation illustrated above is shown in a schematic vertical cross section in addition to the horizontal top view shown above it. As can be seen, unmanned aircraft 110 and aircraft 111 move toward each other so that there is danger of an imminent collision. Thereby, the protective zoned include one zone below and above the flight altitude of the aircraft which is indicated by a horizontal line 121.

Figure 12:
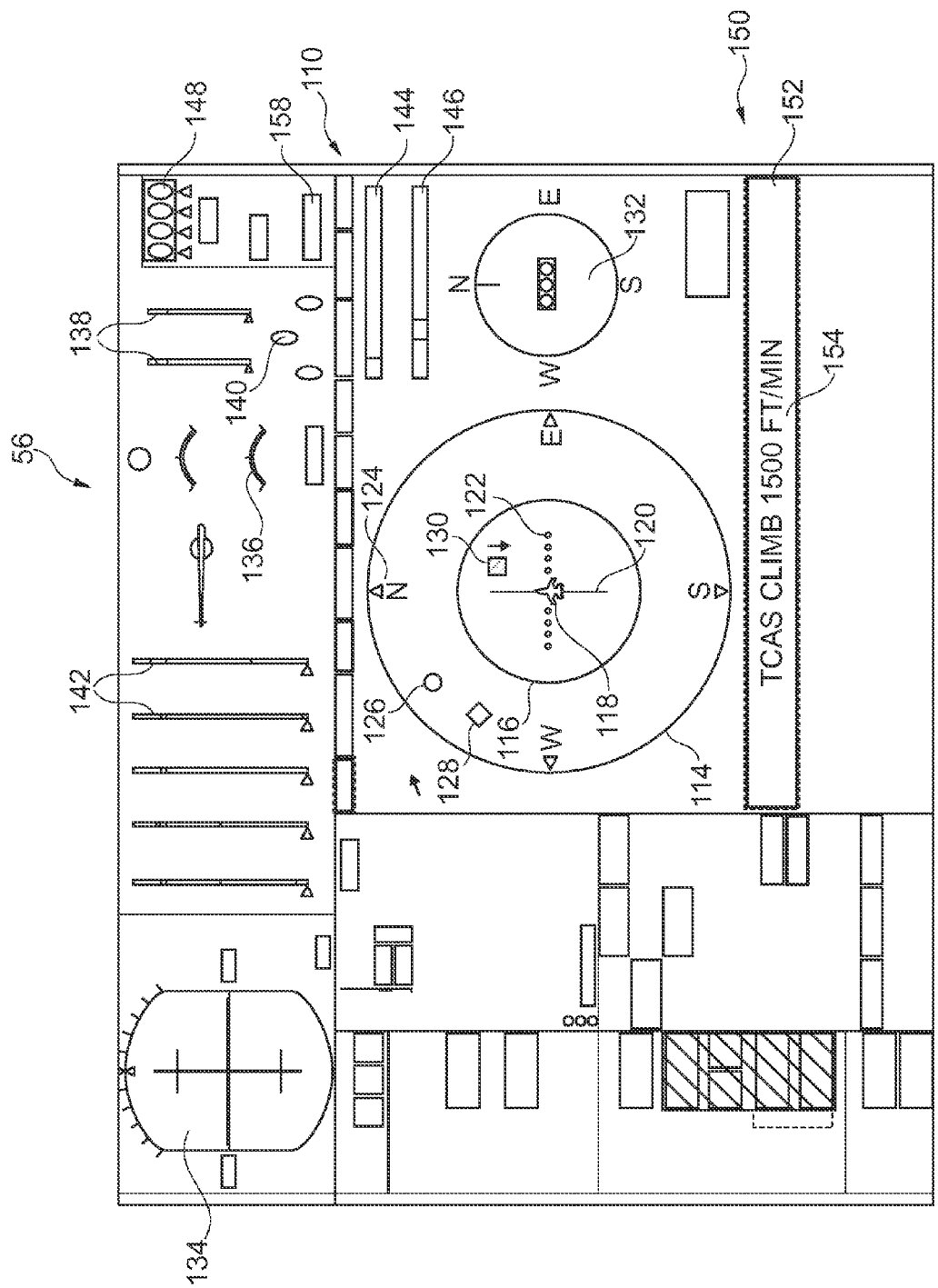
FIG. 12 a further exemplary embodiment of a control station according to the invention for use in an unmanned aviation system according to the invention.

In FIG. 12, a cut-out of the already cited input device 46 is shown, which is provided in the control station in order to monitor and also control the flight of the unmanned aircraft. Shown is an exemplary embodiment for the previously cited display 56 of the man/machine interface, also described as Human Machine Interface (HMI). In FIG. 12, display 56 is shown in the form of a monitor 110, on which, in a relatively central position, a first section 112 is located, in which—in the center of two concentric circles 114 and 116 a symbol 118 is located representing the unmanned aircraft. The circles are used to estimate the distance by the pilot and are also described as range rings. Unmanned aircraft 118 is provided with a flight direction line 120 in its direction of flight and extending transverse to it, a dotted line 122. Within outer circle 114 of the two concentric circles, cardinal direction information 124 is also provided.

The surrounding aircraft (intruders in TCAS lingo) are shown in relation to range rings, for example, by a symbol in the form of a circle 126, a square 128 standing on one of its corners, or a solid square 130. The symbolism can be assumed by the TCSA, for example.

The further, additional information illustrated on display 110 will not be addressed in detail.

Let it only be mentioned that, for example, to the right of the collision warning range, a compass 132 is shown, and a section in the left upper corner with an artificial horizon 134.

Furthermore, there is information such as, for example, a fuel tank status display 136, a hydraulic status display 138, a landing gear status display 140, and among others, also an oil status display 142 having the oil temperature and oil pressure. Moreover, in the proximity of the compass, above it, an altitude measurement reading 144, as well as a speed display 146 are shown. Finally, in the upper right corner there is also a field for setting the detection of a transponder 148. The additional content of the illustration is to be understood as being only exemplary. It has no influence on the illustration of the collision warning system and can be classified as being independent with respect to it.

According to the invention it is further provided that in the event of a detected collision situation, the collision avoidance data are shown in the form of an obstacle avoidance recommendation. For this, underneath the central section 112 having the various protective zones and unmanned aircraft 118 located in its center, a collision information transmission range 150 is provided, which, for example, can be designed as clearly recognizable bar section 152 that extends horizontally. The collision avoidance data can, as has already been mentioned, can contain control commands for the obstacle avoidance maneuver, which can be illustrated as text 154.

For example, in FIG. 12, an instruction "TCAS Climb 1,500 ft/min" is shown, to make it possible for an operator, who is in the control station to first become aware of this information or display.

When a data connection exists to the unmanned aircraft, an operator can now input a corresponding control command into the input fields of the interface shown as monitor. As it is provided according to the invention that except in the case where an operator deactivated the autopilot's obstacle avoidance maneuver, the performance of an obstacle avoidance maneuver always happens automatically on account of the autopilot, the operator receives that information, which is being executed by the autopilot system on board of the unmanned aircraft.

According to one aspect, manual input of control commands is not provided. The display of the TCAS warnings is for the information of the operator, i.e., his awareness of the situation, as he could otherwise misunderstand an ascent or descent (not commanded by him) of his unmanned aircraft as a malfunction of the autopilot. Furthermore, the operator, if he considers it necessary, can break off the obstacle avoidance maneuver.

For example, the bar-shaped illustration 152 can be represented by a color, for example, red, in order to thereby reference the second warning or directive step, in which, in the case of an activated or not deactivated autopilot, the performance of the obstacle avoidance maneuver will take place.

If, for example, no critical situation is imminent, i.e., the collision warning system has not detected a collision situation—it can be provided as an additional option—that the display is represented green for example in the form of a bar, and without text or perhaps with text, indicating that no warning situation is present. In the event of a successfully performed obstacle avoidance maneuver, i.e., "clear of conflict", the display of bar 152 can be green, which is, however, not shown in further detail.

In the context of the so-called "dark and silent cockpit" philosophy in which only deviations from the target state are displayed separately, it can be provided that a separate display that would indicate that no conflict is present is dispensed with; the surface provided to display the warnings simply remains black/dark in this case, i.e., there is no display.

Figure 13:
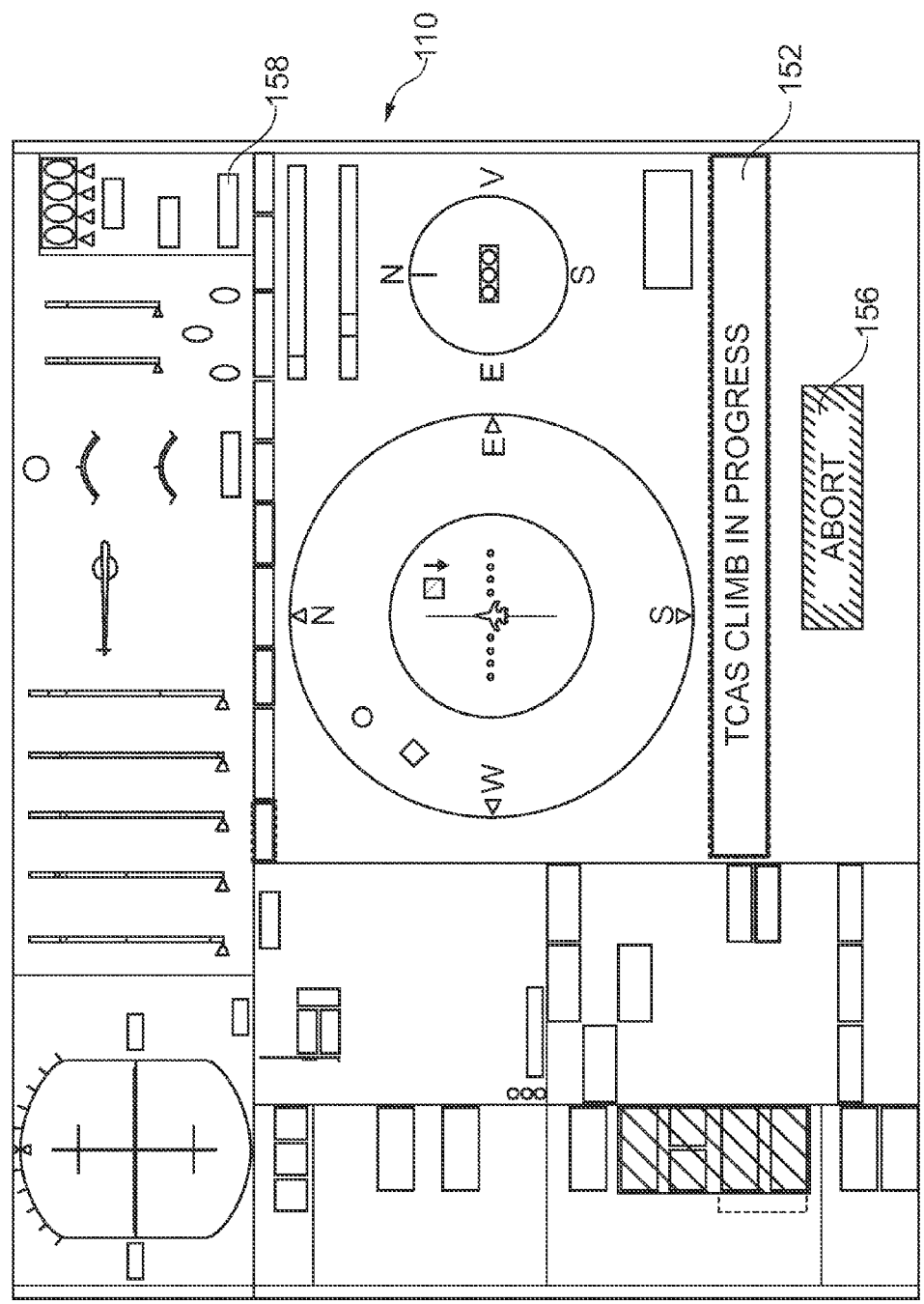
FIG. 13 a further aspect of the control station shown in FIG. 12.

As has already been mentioned, in the context of the text display shown in FIG. 12 and also in FIG. 13, of the respective obstacle avoidance maneuver, the correspondingly allowed zones can also be shown in addition, which has the effect that all information that is necessary for the assessment of the obstacle avoidance maneuver is shown visually and textually integrated.

In FIG. 13, a further embodiment of display 110 from FIG. 12 is shown, for which reason the same illustrations are not again identified with a reference number. In this case, bar 152 is also red, it has, however, other text information, namely the information that the unmanned aircraft is in an ascension process, which is represented by the statement "TCAS climb in progress".

In an existing data connection between the control station and the unmanned aircraft there now also exists the possibility of generating a signal that is not shown in further detail, which was, however, mentioned above several times already, which can be conveyed to the unmanned aircraft by the data connection, in order to cause at least a temporary prevention of the execution of an obstacle avoidance maneuver.

This can take place, for example, by a field 156 that is identified by the term "ABORT", which can, for example, be activated by a mouse click in order to abort the obstacle avoidance maneuver that is being performed, namely stop the climbing process. The abort button or the abort field 156 allows an explicit abort of the obstacle avoidance maneuver. If a switch to a lower operating mode or activation of a so-called lower operating mode of the collision warning system takes place so that no obstacle avoidance recommendations are generated any longer, the function of the automatic obstacle avoidance is thereby also deactivated, i.e. this represents an implicit abort of the obstacle avoidance maneuver.

As mentioned already, according to the invention in the event of an interruption of the data connection between the control station and the unmanned aircraft, the autopilot on board of the unmanned aircraft restarts the obstacle avoidance maneuver, if such should still be required automatically. This ensures that an operator can intercede in the processes, i.e., the control on board of the unmanned aircraft via the control station by overriding, for example, by interrupting the obstacle avoidance maneuver, but then, when the operator has no control over the unmanned aircraft, namely when the data connection is broken or interrupted or also allows only incomplete data transmission, the unmanned aircraft can be returned into a safe mode, namely the automatic execution of obstacle avoidance maneuvers by the autopilot.

Figure 14:
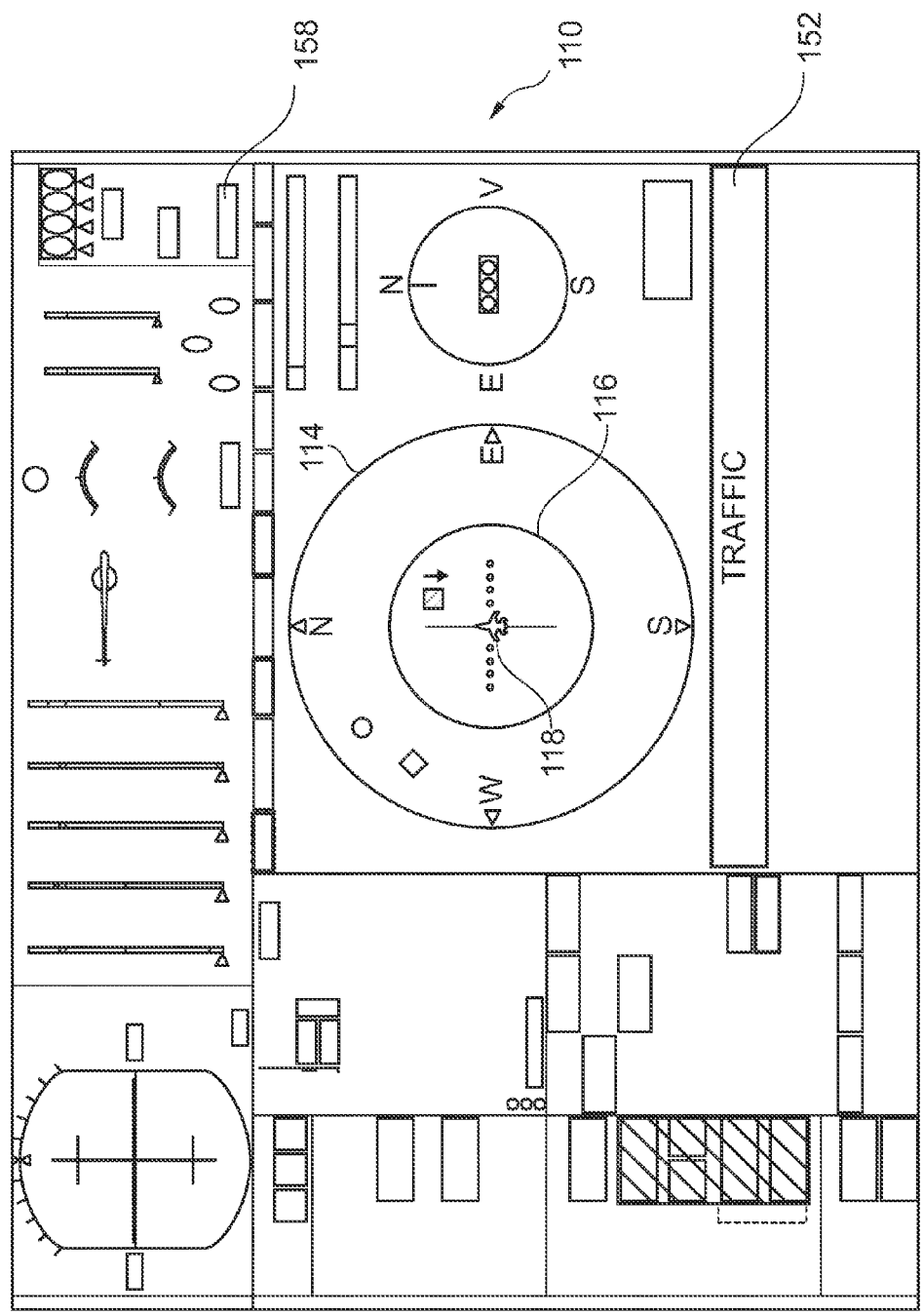
FIG. 14 a further aspect of the control station shown in FIGS. 12 and 13.

FIG. 14 shows a further aspect of display 110. The bar-shaped section 152 is, for example, shown in an orange tone, that is clearly different from the red of the illustrations in FIG. 12 and FIG. 13. As text information, the word "traffic" is shown, which points to a collision situation, however, represents a collision warning only and no obstacle avoidance recommendation, as is the case in the illustrations in FIGS. 12 and 13.

Even though an aircraft has been detected by the collision warning system within the inner protective zone 116, only a collision warning is indicated, as the collision warning system is in an operating mode in which only collision warnings are emitted. This is shown with a display 158 in the right upper area of display 110, in which the information "TA only" is located, which points out that only collision warnings are shown. In contrast, in FIG. 12 and FIG. 13, display device 158 for the operating mode of the collision warning system is set to mode TA/RA, i.e., collision warnings and, to the extent required, obstacle avoidance recommendations will also be displayed.

As has already been mentioned, the operator can select the operating mode via the display device, using display 110, which can be activated that simultaneously also serves as control device, as long as there is a data connection with the unmanned aircraft.

For example, an automatic switching to the safe operating mode of the collision warning system, i.e., to the emission of collision warnings and obstacle avoidance recommendations and also a subsequent coupling of the autopilot system for the execution of an obstacle avoidance maneuver takes place, so that it is activated again when the data connection is interrupted in order to always ensure a safe flight operation of the unmanned aircraft.

But beyond that it is also possible that the unmanned aircraft itself is provided with a corresponding data input device in order to—using operating parameters of the aircraft, i.e., the unmanned aircraft, and/or using flight data—activate the operating modes automatically. In the case of an existing data connection, this information is then transmitted to the control station and there, display 158 is shown accordingly.

Figure 15:
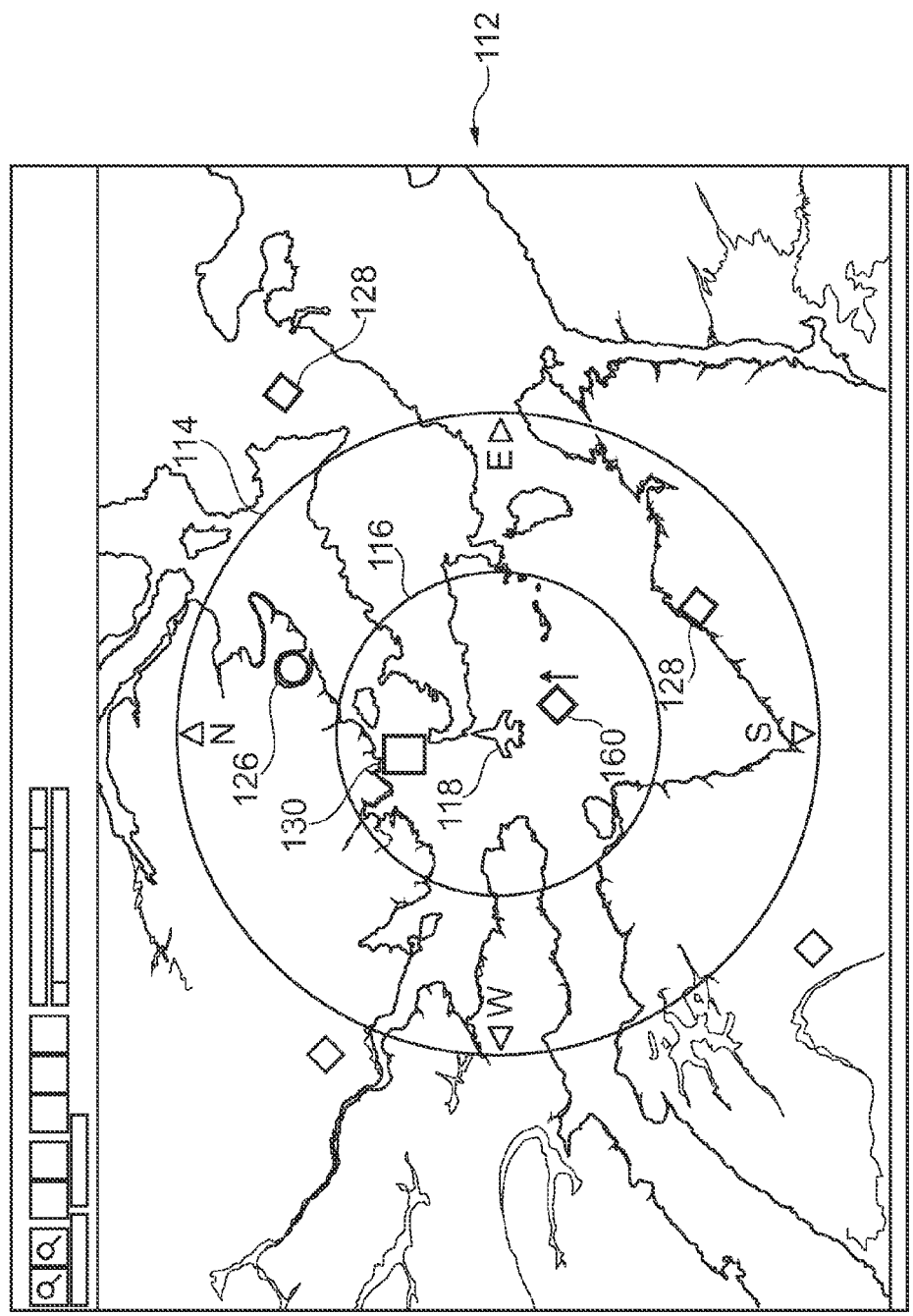
FIG. 15 a further aspect of a control station according to the invention.

According to a further aspect of the invention it can be provided that the collision warning information is furnished together with the symbol for the unmanned aircraft 118 with the illustration of a map as well, as it is shown by way of example in FIG. 15. A central aspect of the combination with a (topographic) illustration of a map is that possible conflicts with the surrounding terrain—that can occur as a consequence of a lateral or vertical obstacle avoidance recommendation of the collision warning system, in particular in mountainous regions—can be identified proactively. In an unmanned aircraft according to the invention, this provides the possibility for identifying and assessing such conflicts if, for example, the actually available bandwidth of the data link does not permit a transmission of video in real time. Even in this illustration, a similar symbolism is used, complemented in this case by a solid square 160 standing on one of its corners.

The methods and processes described above can be performed by a suitable processor that executes processor-executable instructions that are stored in a non-transitory storage medium.

The exemplary embodiments described above can be combined in various ways. In particular, aspects of the devices can also be used for embodiments of the method, as well as the use of the devices and vice versa.

In addition it is to be pointed out that "including" does not exclude any other elements or steps and "a" or "one" does not preclude many. Further, let it be pointed out that characteristics or steps that have been described with reference to one of the above exemplary embodiments and aspects can also be used in combination with other characteristics or steps of other exemplary embodiments described above. Reference numbers in the claims are not to be viewed as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An unmanned aircraft comprising:
   a lift and propulsion system; and
   a flight control system, comprising
   a flight control unit including an autopilot unit;
   a navigation system; and
   an actuator system;
   wherein the flight control unit is configured to calculate control commands using data from the navigation system or the autopilot unit, the control commands are conveyable to the actuator system for actuating the lift and propulsion system,
   wherein a collision warning system is connected with the flight control system, wherein the collision warning system is configured to detect a collision situation and provides collision avoidance data,
   wherein a connection between the collision warning system and the autopilot unit is provided in order to initiate an obstacle avoidance maneuver by the autopilot unit using the collision avoidance data,
   wherein a data connection system is provided for connecting the unmanned aircraft with an external control station for controlling and monitoring flight operation of the unmanned aircraft, and
   wherein the data connection system is provided with a prevention device with which execution of an obstacle avoidance maneuver can be at least temporarily prevented.

2. The unmanned aircraft as recited in claim 1, wherein the collision warning system has at least two operating modes, which can be activated automatically with the help of operating parameters of the aircraft or flight data.

3. The unmanned aircraft as recited in claim 1, wherein in the event of a failure of the data connection system, the collision warning system is automatically connected with the autopilot unit, and wherein in the event of a detected collision situation and generated collision avoidance data, an obstacle avoidance maneuver is automatically executed by the autopilot unit.

4. The unmanned aircraft as recited in claim 1, wherein the external control station's ability to control flight operation of the unmanned aircraft is limited to preventing execution of an obstacle avoidance maneuver.

5. The unmanned aircraft as recited in claim 1, wherein when the prevention device temporarily prevents the obstacle avoidance maneuver the unmanned aircraft returns to an original flight path.

6. An unmanned aviation system, comprising:
- at least one unmanned aircraft comprising
  - a lift and propulsion system; and
  - a flight control system, comprising
    - a flight control unit including an autopilot unit;
    - a navigation system; and
    - an actuator system;
- at least one control station configured to control and monitor flight operation of the at least one unmanned aircraft; and
- a data connection between the control station and the at least one unmanned aircraft;
- wherein the control station has an input device that generates a signal that is conveyed to the unmanned aircraft using the data connection, in order to bring about an at least temporary prevention of the execution of an obstacle avoidance maneuver.

7. The unmanned aviation system as recited in claim 6, wherein the control station has a man/machine interface that is provided with a display, wherein the collision avoidance data is displayed on the display, wherein the collision avoidance data have control commands for the obstacle avoidance maneuver, which can be shown as text.

8. The unmanned aviation system as recited in claim 6, wherein the control station's ability to control flight operation of the unmanned aircraft is limited to preventing execution of an obstacle avoidance maneuver.

9. The unmanned aviation system as recited in claim 6, wherein the signal conveyed to the unmanned aircraft using the data connection in order to bring about the at least temporary prevention of the execution of an obstacle avoidance maneuver causes the at least one unmanned aircraft to return to an original flight path.

10. A method for collision avoidance during the flight operation of an unmanned aircraft, comprising:
- detecting a collision situation with a collision warning system of the unmanned aircraft;
- generating collision avoidance data by the collision warning system;
- conveying the collision avoidance data to an autopilot unit of the unmanned aircraft;
- initiating an obstacle avoidance maneuver by the autopilot unit;
- receiving, by the unmanned aircraft from an external control station via a data connection, a prevention signal; and
- temporarily preventing, by the unmanned aircraft, the obstacle avoidance maneuver in response to the prevention signal.

11. The method as recited in claim 10, wherein upon a failure of the data connection, the collision warning system is automatically connected with the autopilot unit and in the event of a detected collision situation and generated collision avoidance data, the autopilot unit automatically performs a collision avoidance maneuver.

12. The method as recited in claim 10, wherein the only commands received by the unmanned aircraft from the external control station is the prevention signal.

13. The method as recited in claim 10, wherein the temporary prevention of the obstacle avoidance maneuver comprises the unmanned aircraft returning to an original flight path.

* * * * *